United States Patent [19]

Bader et al.

[11] Patent Number: 5,115,486
[45] Date of Patent: May 19, 1992

[54] FLEXIBLE OPTICAL GRADED-INDEX PROFILE FIBER FOR TRANSMISSION OF LASER RADIATION WITH HIGH OUTPUT WITH SUBSTANTIAL PRESERVATION OF THE MODE STRUCTURE

[75] Inventors: Hubertus C. Bader, Mainz; Kurt Nattermann, Ingelheim; Uwe Rutze, Mainz, all of Fed. Rep. of Germany

[73] Assignee: Schott Glaswerke, Mainz, Fed. Rep. of Germany

[21] Appl. No.: 644,638

[22] Filed: Jan. 23, 1991

[30] Foreign Application Priority Data

Jan. 23, 1990 [DE] Fed. Rep. of Germany ....... 4001781

[51] Int. Cl.⁵ .............................................. G02B 6/18
[52] U.S. Cl. .................................... 385/124; 385/127
[58] Field of Search ............... 350/96.31, 96.30, 96.32, 350/96.33, 96.34; 385/124, 125, 126, 123

[56] References Cited

U.S. PATENT DOCUMENTS

| | | | |
|---|---|---|---|
| 4,452,508 | 6/1984 | Beales et al. | 350/96.31 |
| 4,755,022 | 7/1988 | Ohashi et al. | 350/96.31 X |
| 4,804,247 | 2/1989 | Kyoto et al. | 350/96.31 X |
| 5,013,131 | 5/1991 | Fotheringham | 350/96.31 |

Primary Examiner—John D. Lee
Assistant Examiner—Phan T. Heartney
Attorney, Agent, or Firm—Millen, White & Zelano

[57] ABSTRACT

A flexible optical multimode fiber for the transmission of laser radiation with high radiation output is described in which the mode structure of the radiation is substantially preserved. The fiber is especially suited for transmitting radiation in Gaussian modes. The dimensioning of the fiber is indicated, and a composition for fibers for the spectral region of about 250 nm to 2 microns is proposed.

20 Claims, 1 Drawing Sheet

FLEXIBLE OPTICAL GRADED-INDEX PROFILE FIBER FOR TRANSMISSION OF LASER RADIATION WITH HIGH OUTPUT WITH SUBSTANTIAL PRESERVATION OF THE MODE STRUCTURE

BACKGROUND OF THE INVENTION

The invention relates to a flexible optical graded-index profile fiber.

There is a multiplicity of lasers for the visible, near infrared and near ultraviolet spectral regions. E.g., the Nd:YAG lasers radiate at the wavelength of 1.064 microns. Their initial output can exceed 100 W in the continuous-wave operation, and the peak output can be many MW in pulsed operation. Many of these lasers radiate in modes with low order, and so-called Gaussian modes or similar modes often occur.

Generalized mode order m is used for ordering the modes. For Gauss-Hermite modes (typically for lasers with "cartesian geometry"), e.g., $m = n_x + n_y + 1$, and $n_x$ and $n_y$ are the mode order relative to the x and y axis; $n_x$ or $n_y$ is the number of nodes in the intensity distribution perpendicular to the beam axis in x or y direction. For Gauss-Laguerre modes (in cylinder symmetry), $m = 2 \cdot p + 1 + 1$, and p and l are the radial and azimuthal mode order. This classification is known to one skilled in the art, who also uses it correspondingly even if Gaussian modes are not involved in the modes.

In lasers with high output, m is almost always greater than 1. Then, it can hardly be achieved that only one mode occurs—the lasers alternate modes during operation or radiate at the same time in several modes. But there is an upper limit o for generalized mode order m of the radiation of a laser, perhaps since higher modes are not made because of its resonator configuration. Number o is designated as the maximum mode order of the radiation. The overall number of modes which the laser can radiate scales about like $\sim o^2$.

For the uses, e.g. in material processing, a low mode order is mostly advantageous, i.a., since the radiation can be brought to focus on small focal spots or optical systems for imaging, the radiation can be configured more simply. The mode order therefore can often be connected with the concept of the beam quality: the quality of the laser radiation is the higher the smaller the mode order, and it is distributed over fewer modes. For many uses of lasers with high output, e.g. the beam quality is sufficient if maximum mode order o is less than about 10.

For transmission of the laser radiation with high output, flexible fibers are often necessary. These fibers have to be able to transmit not only high radiation outputs, but they are not to permit the mode structure of the radiation to worsen; thus, e.g., increasing the maximum mode order specified by the laser as little as possible. Fibers for transmission of laser radiation are known in the art, but the known fibers with high output or good mode structure show considerable defects in the transmission of radiation.

For transmission of a basic mode (o = 1), monomode fibers are suitable. These can be made as graded-index profile fibers, e.g. as power-law index profile fibers with the refractive index profile $$n^2_k(r) = n^2_{ki} - (n^2_{ki} - n^2_{ka}) \cdot (2 \cdot r / D_k)^g \text{ for r less than } D_k/2 \quad (1)$$

with exponent g ($n_{ki}$: refractive index in the center of the fiber; $n_{ka}$: refractive index on the interface at the fiber cladding, $n_{ki}$ greater than $n_{ka}$; r: distance from the fiber axis; $D_k$ diameter of the fiber core); but in practice, step index fibers are preferred. However, monomode fibers can transmit no modes with higher order and because of their small core diameter, generally only a few microns, they also can transmit no high radiation outputs. Fibers for transmission of radiation with high output in modes with high order have to be multimode fibers. Their core diameter is at least some tens of microns.

Flexible multimode step index fibers for transmission of laser radiation with high output are known (Schott Product Information 1024e, "Special fibers made of quartz glass," 1989, Schott Glaswerke, Mainz). Multimode step index fibers are unsuitable, however, for transmission of radiation with good mode structure, since their fiber modes (the conditions of radiation in the fiber are designated as fiber modes) are greatly different from the laser modes. In the launching of the radiation, a multiplicity of fiber modes is generally excited.

It is assumed that $r^2$ fibers can transmit radiation in modes with higher order, especially Gaussian modes (J. A. Arnaud, "Beam and Fiber Optics," Academic Press, New York, 1975, ISBN 0-12-063250-0). In the core of cylindrical $r^2$ fibers the position dependence of the refractive index follows the relation $$n^2_k(r) = n^2_{ki} - (n^2_{ki} - n^2_{ka}) \cdot (2 \cdot r / D_k)^g = n^2_{ki} \cdot (1 - (f \cdot r)^g) \quad (2)$$
with $g = 2$ (r: distance from the fiber axis; $D_k$: core diameter; $n_{ki}$, $n_{ka}$: refractive index in the center of the fiber and on the interface at the cladding, $n_{ka}$ is less than $n_{ki}$; f: specific convergence, a measurement for the curvature of the refractive index profile).

Although the operating expense for the achievement of certain refractive index profiles in fibers is very high (K. W. Raine, J. G. N. Baines, D. E. Putland, "Refractive Index Profiling-State of the Art," J. Lightw. Techn. 7, 1162-1169, 1989), a sufficiently good $r^2$ graded-index profile so far has not yet been achieved.

Multimode fibers with "$r^2$-similar" graded-index profiles are known. U.S. Pat. No. 38-23-997 describes, e.g., a fiber for communication engineering uses, whose refractive index profile is optimized with respect to the reduction of the modal operating time scattering (operating time a function of the fiber modes of the mode order). For the exponents of the refractive index profile of this fiber, g approximately equal to $2 - (n_{ki} - n_{ka})/n_{ki}$ applies, g has virtually the value 2. DE-PS 27-45-715 describes a fiber with g approximately equal to 1.92 for the same use, for which materials are proposed: the core of the fiber consists of $GeO_2$— and $P_2O_5$-doped $SiO_2$. Such "communication fibers" are unsuitable for transmission of high radiation output, since the radius of the fiber modes is too small. Further, these fibers worsen the mode structure of the radiation by the transmission, since the fiber modes correspond only slightly to the laser modes. And even though only a few fiber modes are excited in the launching of the radiation in these fibers, the radiation is unselectively distributed on the fiber end to many fiber modes because of the strong coupling of the radiation output between the fiber modes.

To confine the radiation securely in the fiber core and to keep the modal operating time scattering small, the refractive index difference in the core is usually selected large in the known fibers. In the graded-index profile fibers of glass with a $SiO_2$ base for transmission of radiation in the near ultraviolet to near infrared spectral region, $\Delta n_k$ is often greater than $20 \cdot 10^{-3}$ or even greater than $30 \cdot 10^{-3}$. Large values for $\Delta n_k$ require compositions or production processes for the fibers, which do not allow a precise adjustment of the refractive index profile or lead to other drawbacks.

DE-PS 32-61-536 describes, e.g., a fiber, in whose core a refractive index profile is caused by a radially variable doping with metal oxides (MgO, SrO, BaO, etc.). But this fiber is sufficiently conductive only in the spectral region from 1100 nm to 1500 nm.

For fibers for transmission of radiation of the near ultraviolet to near infrared spectral region, $GeO_2$, $P_2O_5$, $B_2O_3$ or F dopings are preferably introduced in $SiO_2$ glass tubes using inner coating CVD processes. $GeO_2$ or $P_2O_5$ dopings and mixtures of these dopants act in $SiO_2$ glass in a refractive index increasing manner. $B_2O_3$ or F dopings and their mixtures act in a refractive index decreasing manner. A position-dependent refractive index in the tube follows from a position-dependent doping, a glass rod results by collapsing the tube, the fiber results by drawing of this so-called fiber preform.

The $B_2O_3$ doping can cause absorption bands or the weakening mechanical strength of the fibers. The F doping is therefore preferred to lower the refractive index. But since the refractive index lowering by fluorine in $SiO_2$ glass is small and the maximum F portion has to remain small, fibers, in which the refractive index profile is adjusted only by an F doping of the core, are not used.

Usually, the refractive index profile in the fiber is produced by a refractive index increase and for this purpose, the core is doped position-dependently with $GeO_2$ or $P_2O_5$. The $GeO_2$ doping is especially preferred, since its portion in $SiO_2$ glass can be high and it greatly raises the refractive index. Fibers whose cladding additionally is doped with fluorine to achieve a greater refractive index difference between the core and the cladding are also known. EP-PA 01-25-828 describes a fiber with a core doped strongly with $GeO_2$, whose cladding is doped strongly with fluorine in a thin layer around the core, and the F portion in this layer is constant or radially decreases from inside to outside.

Although the influence of the dopants on the refractive index works in a contrary sense, it occurs in isolated cases that the core is doped both with $GeO_2$ or $P_2O_5$ and with fluorine; but the reasons for it are not to be found in the refractive index profile. In the fiber described in EP-PS 01-60-244, e.g. an additional fluorine doping of the core doped mainly with $GeO_2$ or $P_2O_5$ brings about a lower fundamental absorption in the UV region. EP-OS 01-91-202 describes a fiber, whose core contains specific dopants, i.a., also fluorine, to reduce the so-called drawing contribution to the Rayleigh scattering of the fiber—but these "more unpure" fibers have a smaller destruction threshold and are therefore unsuitable for transmission of high radiation outputs.

In inner coating processes with $GeO_2$ or $P_2O_5$, a "refractive index dip," a decrease of the refractive index in the center of the fiber, regularly occurs. The dip results during the collapsing of the glass tubes by evaporation of the doping materials, since its vapor pressure is higher than the vapor pressure of the $SiO_2$. The dip therefore leads to a strong coupling between the fiber modes and thus to a reduction of the quality of the beam. By careful collapsing, the dip can be reduced. It is known, e.g., from DE-PS 34-19-835 to expose the inside of the tubes to a vapor with a defined composition during collapsing so that the dip is small. Also, it is often attempted to suppress the dip in that the material evaporating during collapsing is already taken into consideration in the doping. However, altogether these processes work only in a slightly reproducible manner.

The refractive index dip could be avoided if the fiber preforms were produced with outer coating or sintering processes, as described, e.g., in EP-PS 01-75-067. These processes, however, have the drawback that the refractive index profile cannot be set finely enough or that the fiber material is not pure enough to transmit laser radiation with high output with the fibers.

DE-PS 28-37-338 describes a multimode fiber for communication engineering uses, in which the influence of the dip is compensated by a suitable configuration of the refractive index profile outside the dip. But this fiber is also not suitable for transmission of laser radiation with high output and good mode structure.

SUMMARY OF THE INVENTION

This invention provides a fiber for transmission of radiation with high radiation output, in which the mode structure of the output-coupled radiation in comparison with the mode structure of the radiation launched in the fiber is preserved as well as possible, which can transmit the Gaussian mode especially well and which is simple to produce.

This invention is achieved by providing a flexible, optical, graded-index profile fiber for transmission of laser radiation with high output with substantial preservation of the mode structure, with a core with diameter $D_k$, a cladding around the core and a protective sheath around the cladding, whose refractive index profile in the core basically follows the law of exponents $$n^2_k(r) = n^2_{ki} - (n^2_{ki} - n^2_{ka}) \cdot (2 \cdot r / D_k)^g$$

and r is the distance of the fiber axis, $n_{ki}$ is the refractive index in the fiber axis and $n_{ka}$ is the refractive index in the core on the interface at the cladding, with $n_{ki}$ greater than $n_{ka}$, characterized in that a) core diameter $D_k$ is between $200 \cdot 10^{-6}$ m and $800 \cdot 10^{-6}$ m,
b) but $D_k$ is at least 2.5 times $(o' \cdot \lambda)/\sqrt{\Delta n_k}$ and o' has the value 5, if the maximum mode order of laser radiation o is less than 5, $o' = o$, if o is in the range of 5 to 20, or $o' = 4.5 \cdot \sqrt{o}$ if o is greater than 20, $\sqrt{\Delta n_k}$ is the root of refractive index difference $\Delta n_k$ in the core and $\lambda$ is the wavelength of the laser radiation to be transmitted,
c) exponent g is between 1.4 and 3.0
d) and the refractive index difference in the core, $\Delta n_k = n_{ki} - n_{ka}$, is greater than $1.6 \cdot 10^{-3}$.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

Figure 1:
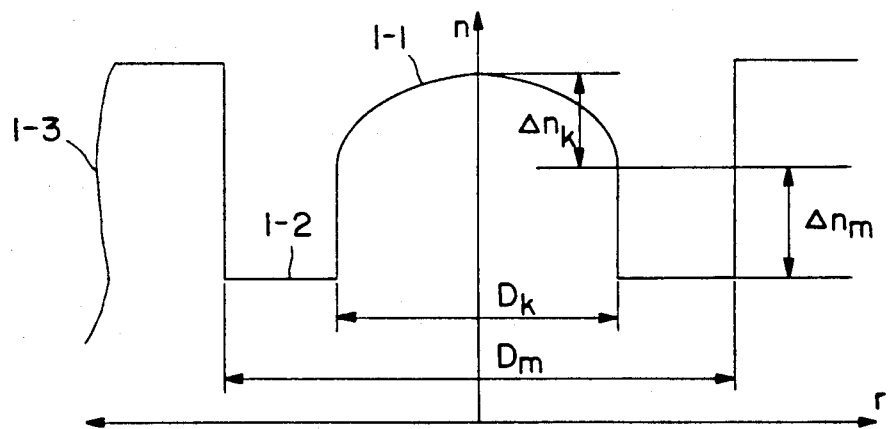
FIGS. 1 to 3 advantageously show preferred configured fibers. The dependence of the refractive index on the distance from fiber axis r for the core and the inner part of the cladding are respectively sketched there. For a better representation the figures are not true to scale.

A basically cylindrical fiber is preferred, since cylindrical fibers suffice for the important uses and since they can be produced most simply. But this description applies without significant changes also for fibers with a cross section which is not round. The preferred fiber according to the invention has a basically cylindrical core, around which there is a cladding with one or more layers, which is basically concentric to the core. The core and the cladding guide the radiation in the fiber. The somewhat random differentiation of the radiation guiding zones of the fiber in the core and the cladding is usual and is well known to one skilled in the art.

The radiation is guided mainly in the core. Therefore, the radiation damping (absorption and scattering) by the core material has to be low. Which damping coefficient for the core material is permissible in this case depends on the necessary fiber length. Finding suitable materials with sufficiently low damping values is generally no problem and fully conventional considerations and knowledge suffice.

The refractive index profile in the core of the fiber largely follows the relation:

$$n^2_k(r) = n^2_{ki} - (n^2_{ki} - n^2_{ka}) \cdot (2 \cdot r / D_k)^g \text{ for r less than } D_k/2 \quad (3)$$

In this case, g is the exponent of the refractive index profile of this fiber, r is the distance from the fiber axis, $D_k$ is the core diameter. $n_{ki}$ is the refractive index in the axis (r=0), and $n_{ka}$ is the refractive index in the core directly on the interface at the cladding (r = $D_k/2$). To be able to guide the radiation reliably in the core, $n_{ki}$ is greater than $n_{ka}$. The refractive index profile is similar to that according to equation (1) for the power-law index profile monomode fibers. But the fiber according to the invention is a multimode fiber with a core diameter $D_k$ of at least 200 microns; thus it can transmit radiation in modes with higher order and thus the radius of the fiber modes is large enough to be able to transmit high radiation outputs with the fiber.

Large values are advantageous for the radius of the fiber modes, so that in fluctuations of the laser output, the intensity in the core does not exceed the damage limiting value of the core materials and damage the fiber. Further, it is difficult with a small radius of the fiber modes, in the case of the launching, to match precisely the radius of the radiation modes to the radius of the fiber modes, as is necessary for a transmission with high beam quality. The radius of the fiber modes increases when the core diameter of the fiber is increased. Therefore core diameter $D_k$ is preferably more than 300 microns.

For a core diameter of more than 800 microns, the fiber is not mechanically usable. In most cases a thinner core is preferred, since then a thick cladding can be around the core, which shields it from outside influences, without the flexibility of the fiber being impaired. A thinner core is also advantageous from a production engineering aspect, e.g. since then the wall thickness of the initial glass tube can be thicker in the inner coating process, by which the errors of symmetry of the fiber can be more simply reduced. For flexible fibers, values of at most 600 microns are therefore preferred for the core diameter.

Still other restrictions are to be considered for the core diameter. If core diameter $D_k$ is too small, a strong mode coupling takes place in the fiber since the intensity of the fiber modes is high on the core-cladding interface. Therefore, additional lower limits are to be maintained for $D_k$. If maximum mode order o is between 5 and 20, $D_k$ is greater than $2.5 \cdot o \cdot \lambda / \sqrt{\Delta n_k}$, and $\sqrt{\Delta n_k}$ designates the square root of refractive index difference $\Delta n_k = n_{ki} - n_{ka}$ and $\lambda$ designates the radiation wavelength. For o less than 5, the lower limit according to the above formula is too low, then $D_k$ is to be greater than $12.5 \cdot \lambda / \sqrt{\Delta n_k}$. For radiation with a high maximum mode order, about o greater than 20, the radiation already consists of many modes with a high order at the laser output. Therefore, the requirements for a fiber for transmission of this radiation relative to the preservation of the beam quality are fewer: a slight coupling of the fiber modes can be allowed in the transmission, the beam quality is thus only insignificantly reduced. For fibers for transmission of radiation with o greater than or equal to 20, the increase of core diameter $D_k$ can therefore be less with increasing mode order: a core diameter of at least $2.5 \cdot (4.5 \cdot \sqrt{o}) \cdot \lambda / \sqrt{\Delta n_k}$ is sufficient. In this case, the observation was used that in radiation with high mode order, the radiation intensity radially decreases very quickly when one is removed far enough from the beam axis, i.e. the contour of the beam is generally sharply defined. This lower limit for $D_k$ is actually very low—but it is sufficient for fibers with a good adherence to the fiber geometry, with careful launching of the radiation in the fiber and only slight bends to transmit the radiation with high quality.

But in practice, it can be necessary, e.g., for the fiber in the radiation launching to exhibit a high tolerance for mismatchings of the mode radius of the radiation modes to the mode radius of the fiber modes. In such cases, if maximum mode order o is between 3 and 20, lower limit $5.0 \cdot o \cdot \lambda / \sqrt{\Delta n_k}$ is preferred for core diameter $D_k$. If o is less than 3, lower limit $15 \cdot \lambda / \sqrt{\Delta n_k}$ is preferred for core diameter $D_k$. For maximum mode orders with o greater than 20, $5 \cdot (4.5 \cdot \sqrt{o}) \cdot \lambda / \sqrt{\Delta n_k}$ is sufficient as lower limit for the core diameter. Such a fiber can still transmit radiation with a good beam quality, even if the mode radius of the radiation modes in the launching deviates more than ±50% from the mode radius of the fiber modes.

If the fiber dimensions allow it, the radiation launching in the fiber can be further simplified and above all the insensitivity to bending of the fiber can be improved, if still larger values for $D_k$ are selected. For $3 < o < 20$ in which o designates the maximum mode order, $D_k$ is greater than $8 \cdot o \cdot \lambda / \sqrt{\Delta n_k}$ in the strongly preferred embodiment. If o is less than 3, lower limit $24 \cdot \lambda / \sqrt{\Delta n_k}$ is preferred for core diameter $D_k$. Then, the fiber generally can be bent to radii which are less than 50 mm, without a strong overcoupling of radiation output taking place between fiber modes.

It is expected that for fibers for transmission of radiation with ordered mode structure, it is advantageous for exponent g to be set as exactly as possible to value 2. But, for the fiber according to the invention, it was surprisingly found that g may deviate greatly from value 2: g, according to the invention, is in the range of 1.4 to 3.0—the other features of the fiber cause the deviations of the refractive index profile not to be disadvantageous.

This observation that the fiber can transmit the radiation well even for strong deviations of exponent g from value 2, is, it is theorized (without wishing to be bound thereby), explainable, in that the profile according to equation (3) in the vicinity of the fiber axis, where most of the radiation is guided, can be well approximated by a parabolic profile.

For a maximum order o of up to 5, in most cases even no effective coupling at all occurs between the modes, i.e., the mode structure is transmitted perfectly if exponent g is in the range indicated above.

With increasing mode order, the radiation is guided in off-axis zones of the core. There, the approximation of the refractive index profile by the parabolic profile can be poorer, consequently, a weak coupling can still occur between the modes. Although the slight deterioration of the beam quality thus caused in most cases can be disregarded in practice, it can then be advantageous for exponent g to be selected in narrower limits. If maximum mode order o is less than 10, it is preferred that exponent g is in the range of 1.6 to 2.4, and if o is greater than 10, it is preferred that g is in the range of 1.8 to 2.2. Thus, it is especially achieved that the coupling of radiation output in modes with still higher order is very slight.

Production engineering simplifications result from the above-mentioned bandwidth for exponent g of the refractive index profile of the fiber; thus, even technologies other than the usual ones can be used in the production of the fiber, and the fiber is insensitive relative to small refractive index fluctuations. That is advantageous if, as can be the case in the fiber according to the invention, the refractive index difference in the core is only small.

By the bandwidth for exponent g the difficulty occurs that the exact radius of the fiber modes—knowing it is necessary for a perfect radiation launching in the fiber—can be predetermined only with difficulty (theoretically); but this is no significant difficulty since measuring processes are known to determine the radius of the fiber modes on finished fibers. Further, it was observed that the dependence of the mode radius on exponent g or on fluctuations caused by production of the refractive index profile can be smaller precisely if value 2 is avoided; generally for this purpose, already very small deviations are sufficient, preferably on the order of 1% (e.g., g<1.98 or g>2.02).

The refractive index difference in the core of the fiber according to the invention, $\Delta n_k = n_{ki} - n_{ka}$, is greater than $1.6 \cdot 10^{-3}$. Thus in smaller values it is to be expected that radiation losses occur since the radiation is not confined in the core.

To be on the safe side, $\Delta n_k$ in a preferred embodiment is greater than $3.3 \cdot 10^{-3}$, thus possibly occurring small fluctuations of the refractive index remain also harmless. This larger value then recommended itself especially if a larger core diameter $D_k$ is selected. If the core diameter of fiber $D_k$ is greater than 300 microns and the refractive index difference is less than $3.3 \cdot 10^{-3}$, e.g., microcurvature losses could occur, which reduce the transmission efficiency of the fiber.

An upper limit for refractive index difference $\Delta n_k$ can result from the requirement that the optical elements are to be simple for launching or outputting the radiation in or out of the fiber (small numerical aperture NA). To achieve this, $\Delta n_k$ is preferably less than $4 \cdot 10^{-4} \cdot (D_k/\lambda)^2/o^2$, and $\lambda$ is the radiation wavelength, $D_k$ is the core diameter of the fiber, and o is the maximum mode order. If this upper limit for the refractive index difference is maintained, optical components with an NA of less than 0.3 (complete angle) can be used. Optics with this NA can still be produced without great expense. More strongly preferred is $\Delta n_k$ less than $2 \cdot 10^{-5} \cdot (D_k/\lambda)^2/o^2$, since then usual optical components with an NA of less than 0.15 generally can be used.

In the core of a fiber for transmission of radiation of near ultraviolet to near infrared spectral region, with wavelengths of about 250 nm to about 2 microns, refractive index difference $\Delta n_k = n_{ki} - n_{ka}$ is advantageously less than $20 \cdot 10^{-3}$. In the fibers of this invention, radius w of the fiber modes with the refractive index difference is scaled to about $w \sim \Delta n^{-\frac{1}{4}}$. For $\Delta n$ greater than $20 \cdot 10^{-3}$, the effect of $\Delta n$ on the mode radius is therefore small and no positive influence is really found anymore on the beam guiding of the fiber.

Smaller refractive index differences in the core are, on the other hand, favorable to be able to produce the fiber with simpler compositions or processes, and since the mode radius of the fiber modes and thus also the output limit of the transmittable radiation is increased. It is more strongly preferred that $\Delta n_k$ be less than $10 \cdot 10^{-3}$; this refractive index difference can be achieved simply with the conventional PICVD process.

In the near infrared spectral region with longer wavelength, approximately for wavelengths of up to 11 microns, larger values for refractive index difference $\Delta n_k$ of up to $200 \cdot 19^{-3}$ could also be advantageous. But for practical reasons (e.g. to keep the numerical aperture of the optical elements small for launching or outputting of the radiation in or from the fiber), the refractive index difference should also, in such cases, be less than $100 \cdot 10^{-3}$.

The observation that a large bandwidth is permissible for exponent g and small values are permissible for refractive index difference $\Delta n_k$ can be explained as follows without intending to limit this invention in any way: The overcoupling of radiation energy between fiber modes is determined for (constructive) overcoupling by "coupling lengths" and "coherence lengths." So that effective overcoupling take place, the coupling length has to be shorter than the related coherence length. Otherwise, the relative phase of the fiber modes reverses itself inside the coupling length and destructive overcoupling sets in, i.e. the radiation output launched in a mode is then removed again and the average output in the mode remains low. It is consequently important to compare the coupling lengths with the coherence lengths. The coupling lengths of the fiber modes are short in the fiber according to the invention, since the deviation of the refractive index profile from the ideal $r^2$ profile is large—but the related coherence lengths are generally still shorter: the coherence length for the interaction between two fiber modes is produced from the mode constants known in the art of the fiber modes; these have for fiber modes approximately the importance the wave vector has for free electromagnetic waves. The more different the mode constants, the shorter the coherence length. It follows from this that the coupling of the radiation output between the modes is effectively suppressed if their mode constants are very different. The fiber according to the invention has this property.

In the known exponential profile fibers with a reduced modal operating time scattering, the situation is especially unfavorable, since in these fibers (with a short operating time scattering of the fiber modes), the mode constants of the fiber modes are similar.

The dispersion of the fiber modes is especially small, i.e., the coherence lengths are especially large, if the fiber has approximately an $r^2$ profile It can thus be favorable for the suppression of the mode coupling, if g is different from 2. For this purpose, exponent g of the refractive index profile of the fiber is preferably less than 1.95 or greater than 2.05. Then with increasing deviation of exponent g from value 2, the coherence length generally is shortened more quickly than the coupling length.

But it is more favorable, especially if the laser radiation mainly consists of modes with a lower order, perhaps with a maximum mode order of o of 10, if the deviations of exponent g from value 2 are even greater. Then, the deviations of the refractive index profile from the $r^2$ profile even near the fiber axis are effective, i.e. the dispersion then becomes effective also for fiber modes with lower order. In the strongly preferred embodiment, exponent g is therefore less than 1.9 or greater than 2.1.

The main object of the cladding in multimode fibers is to make the radiation guiding through the fiber safer. The outside diameter of the cladding is not more than 1.2 mm with easily bendable fibers, fibers with an outside diameter of the cladding of less than 1.0 mm are better, fibers bendable to narrow radii have an outside diameter of the cladding of less than 700 microns. The requirements on the damping coefficients of the cladding material are less than on those of the core material, finding suitable materials is generally no problem.

In favorable cases, e.g. if the maximum mode order of the radiation to be transmitted is low and if the fiber is not too greatly bent, the influence of the cladding on the mode structure of the guided radiation is slight, the cladding material therefore can be nearly homogeneous in the simplest embodiment of the fiber. Otherwise, it is more advantageous, if the refractive index profile is configured suitably also in the cladding. (Since the refractive index difference in the core and the core diameter in the fiber according to the invention can be small, there is generally a sufficient tolerance to be able to structure the refractive index also in the cladding.)

The fiber properties are improved if the refractive index in the cladding on the core-cladding interface decreases to a value $n_m$ below $n_{ka}$ and does not exceed value $n_m$ in a layer with thickness $\delta_i$. By this configuration of the cladding, the beam guiding by the fiber is safer, since it is more improbable in individual strong bendings of the fiber, which, e.g. can occur in the case of operating troubles, that the radiation is output from the core (which in high radiation outputs can even result in the destruction of the fiber).

Thickness $\delta_i$ of the innermost layer of the fiber cladding is preferably at least 10 microns to prevent the radiation from being able to tunnel through this layer.

However, in a fiber with a cladding only 10 microns thick, possibly problems can occur, e.g. if the fiber is crushed on its end in the sleeves. Further, it is shown in practice that the tolerances in the launching of the radiation in the fiber are greater if thickness $\delta_i$ increases. If a handling or production engineering tolerance also is produced for the thickness of the cladding, it is therefore preferred that the thickness of the innermost cladding layer $\delta_i$ be greater than 50 microns.

FIG. 1 shows a fiber, in which the refractive index in the cladding layer lying directly on the core is approximately constant. The core with diameter $D_k$ and refractive index difference $\Delta n_k$ is designated with 1-1, and the innermost layer of the cladding with outside diameter $D_m$ thickness $\delta_i = (D_m - D_k)/2$ and positive refractive index difference $\Delta n_m = n_{ka} - n_m$ is designated 1-2. Still other cladding layers indicated by 1-3 can be found on layer 1-2.

Refractive index lowering $\Delta n_m = n_{ka} - n_m$ is advantageously greater than $1 \cdot 10^{-3}$, since then low refractive index fluctuations caused by production are harmless. Larger values for $\Delta n_m$ and $\delta_i$ are favorable but practical reasons can stand in their way: with very large values for $\Delta n_k$, complicated fiber compositions are necessary. With very large values for $\delta_i$, handling problems can be expected, since the fibers then are no longer flexible enough. However, all such configurations are within the scope of this invention and readily preparable, as also are all other less preferred embodiments described herein.

Even better fiber properties are generally achieved if the refractive index in the innermost layer of the cladding with thickness $\delta_i$ has a basically constant value $n_{mi}$, which is approximately $n_{ka}$ or is somewhat smaller, and in another layer resting directly on the innermost layer with thickness $\delta_w$ has a value $n_{mw}$, which is below $n_{mi}$. With this fiber, it is important that with strong bendings, a part of the radiation is output from the core —but the radiation loss is still guided into the innermost layer of the cladding and first output only on long fiber sections or on the fiber end. If the radiation loss, whose beam quality is clearly poorer than the "orderly guided radiation," reaches, the fiber end, it then can be separated from the orderly guided radiation if the innermost layer of the cladding is thick enough.

In the simplest case, $n_{mi}$ and $n_{ka}$ are the same. To reduce the probability of the radiation loss being recoupled with a poor beam quality in the core, the refractive index in a preferred embodiment is analogously lowered in the fiber in FIG. 1 from the core to the cladding. Refractive index $n_{mi}$ in the cladding on the core-cladding interface is then for the same reasons as described above at least $1 \cdot 10^{-3}$ less than refractive index $n_{ka}$ in the core directly on this interface.

Figure 2:
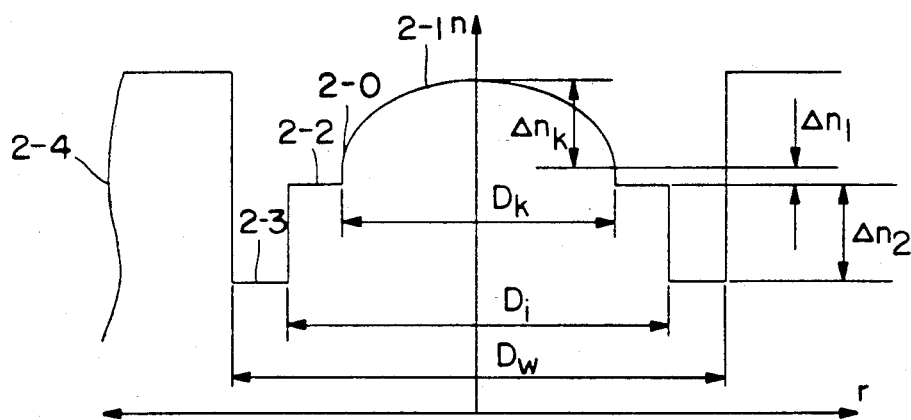

FIG. 2 shows such a fiber. The core-cladding interface is designated 2-0, the core with diameter $D_k$ and refractive index difference $\Delta n_k$ is designated 2-1, the innermost layer of the cladding with refractive index $n_{mi}$, outside diameter $D_i$ and thickness $\delta_i = (D_i - D_k)/2$, is designated 2-2, the other layer of the cladding with refractive index $n_{mw}$, outside diameter $D_w$ and thickness $\delta_w = (D_w - D_i)/2$ is designated 2-3. Refractive index difference $\Delta n_i = n_{ka} - n_{mi}$ results by the lowering of the refractive index during the passing through interface 2-0, and refractive index difference in the cladding $\Delta n_2 = n_{mi} - n_{mw}$ results by the lowering of the refractive index between layers 2-2 and 2-3 of value $n_{mi}$ to value $n_{mw}$. Other cladding layers, indicated by 2-4, may be present on layer 2-3, however, they make no decisive contribution to the beam guiding of the fiber.

The refractive index in layer 2-2 is less than $n_{ka}$, since otherwise the qualitatively poor radiation loss from layer 2-2 could be recoupled in core 2-1. Layer 2-2 acts as a step index fiber for the radiation loss; so that the beam guiding properties of this step index fiber are sufficient, refractive index lowering $\Delta n_2 = n_{mi} - n_{mw}$, is at least $1.5 \cdot 10^{-3}$. Thickness $\delta_i$ is at least 10 microns, so that the radiation cannot tunnel through the innermost cladding layer. This thickness also has the additional advantage that the radiation guided in layer 2-2 can be well separated on the outputting end from the orderly guided radiation. $\delta_i$ is preferably greater than 50 microns to simplify the launching of the radiation: The radiation loss occurring in the launching can then be guided well enough by the step index fiber formed by layers 2-2 and 2-3 so that no damage occurs in the launching (the radiation loss is guided either up to the outputting end of the fiber or output from the fiber on fiber sections which are long and can be cooled well). Larger values for $\Delta n_2$ and $\delta_i$ are favorable, but can lead to production or engineering handling problems. Thickness $\delta_w$ of layer 2-3 is preferably larger than 7 microns, to reduce the probability that the radiation guided in 2-2 can tunnel through this layer.

Refractive index difference $\Delta n_1$ can in principle be very large, but it is hardly necessary that it be greater than $8 \cdot 10^{-3}$, since the positive effect described is already detectable for small refractive index differences, but, on the other hand, larger refractive index differences would considerably limit the production tolerance.

Even better properties of the fiber are obtained if the refractive index of a value $n_{mi}$, which basically corresponds to value $n_{ka}$ continuously decreases to a lower value $n_{ma}$ from inside to outside in the innermost layer of the cladding around the core. Thus, in great bends of the fiber occurring in isolated cases, it is more unlikely that radiation is output in an uncontrolled manner from the core. Further, the quality of the radiation, which reaches the core-cladding interface, is only slightly deteriorated.

Figure 3:
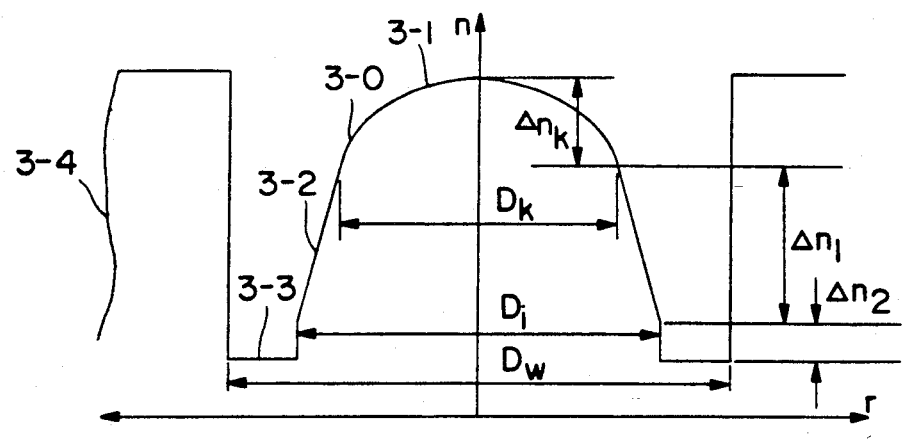

FIG. 3 shows a correspondingly configured fiber. The core-cladding interface is designated 3-0; the core with diameter $D_k$ and refractive index difference $\Delta n_k$ is designated 3-1; the innermost layer of the cladding with outside diameter $D_i$, thickness $\delta_i = (D_i - D_k)/2$ and values $n_{mi}$ and $n_{ma}$ for the refractive index on the inner or outside surface, is designated 3-2. 3-3 and 3-4 are other layers of the cladding. The refractive index in innermost layer 3-2 decreases linearly in this example from value $n_{mi} = n_{ka}$ to value $n_{ma}$; the refractive index difference in layer 3-2 is $\Delta n_1 = n_{ka} - n_{ma}$.

A thickness $\delta_i = (D_i - D_k)/2$ of innermost cladding layer 3-2 of at least 10 microns is preferred, since the radiation can otherwise tunnel through this layer. Refractive index lowering $\Delta n_1 = n_{ka} - n_{ma}$ is preferably greater than $2 \cdot 10^{-3}$, since refractive index fluctuations caused by production can otherwise uncontrollably influence the refractive index profile.

If there is still a tolerance for the thickness of the cladding, it is more strongly preferred that thickness $\delta_1 = (D_i - D_k)/2$ of innermost layer 3-2 be at least 50 microns, so that the radiation loss occurring in the launching in layer 3-2 can be guided well enough.

Analogously to the embodiment in FIG. 2, this effect can thus be intensified so that another layer 3-3 with outside diameter $D_w$ is directly put on the innermost layer of the cladding whose thickness $\delta_w = (D_w - D_k)/2$ is greater than 7 microns and whose refractive index $n_{mw}$ is below $n_{ma}$ and is basically constant. Preferably refractive index lowering $\Delta n_2 = n_{ma} - n_{mw}$ is greater than $1.5 \cdot 10^{-3}$.

A lowering of the refractive index from core 3-1 to the innermost layer of cladding 3-2—refractive index $n_{mi}$ in the cladding on core-cladding interface 3-0 is then less than refractive index $n_{ka}$ in the core directly on this interface—has no positive influence on the beam guiding properties of the fiber and is to be avoided. Instead of this, it is observed that the beam guiding properties of the fiber are improved if the shape of the refractive index during passage through the interface takes place as smoothly as possible (smooth = continuously differentiable, "no breaks" in the refractive index profile).

The diffusion of core or cladding materials through the core-cladding interface or through the interfaces between the various layers of the cladding can influence the refractive index shape in the core or in these layers: the "refractive index steps" in FIGS. 1 to 3 can, e.g., be rounded. But this diffusion as a rule has no measurable effect on the beam guiding properties of the fiber; however, it can be useful in determining the nominal fiber data to specify only the values outside the diffusion zone for the refractive index profile. For this purpose, a distance of a few microns from the interfaces is sufficient in most cases.

The cladding of the fiber can be covered by a single layer or multilayer protective sheath (coating). The coating materials are basically unimportant for the beam guiding properties of the fiber and can be selected so that favorable production or handling conditions or, e.g. mechanical properties of the fiber result. The coating layers preferably consist of glass or plastic.

In the usual production methods for optical fibers, a drop of the refractive index (refractive index dip), e.g. by evaporation of fibers components, is observed in a narrow region around the fiber axis. Such deviations result in greater distortions of the mode structure. For the production of the fiber, compositions and processes are preferred for which a refractive index dip does not occur.

For fibers for transmission of radiation in the spectral region with wavelengths of 250 nm to 2 microns, it is preferred that the core consist almost exclusively of $SiO_2$ glass and fluorine-doped $SiO_2$ glass ($F:SiO_2$) and that the refractive index profile in the core be set by a radially increasing fluorine doping. By this type of doping, refractive index lowerings of a maximum up to $-30 \cdot 10^{-3}$ can be reached, e.g. with inner coating processes in the $SiO_2$ glass, but then these processes are not very reproducible. Therefore, there should be a limitation to refractive index differences of less than $-20 \cdot 10^{-3}$. Even a value of less than $-11 \cdot 10^{-3}$ is advisable to be able to produce the fiber at a low expense. The fluorine doping has the advantage that no noticeable evaporation of the fluorine takes place during the collapsing of the fiber preforms and that therefore no refractive index dip occurs. Another advantage of the fibers, whose core consists only of $SiO_2$ and $F:Si_2$, is that the damage limiting values and the threshold values for harmful nonlinear optical effects, such as, e.g. the stimulated Raman scattering, are high.

It is further preferred that the doping of the fiber is lowest in the center of the fiber, i.e., that the fiber consists of the purest $SiO_2$ glass possible there. Then, still higher damage limit values can be reached; further, a large refractive index difference in the core can thus be set. If the fluorine doping should not be sufficient to reach the desired refractive index shape in the fiber, it is preferred that the fiber in the core consist only of pure and fluorine-doped $SiO_2$, and that the fiber in the cladding be doped in addition with $B_2O_3$ to decrease the refractive index there further.

In some production processes, a continuous shape of the refractive index in the core cannot be set. In the MCVD process, e.g., the refractive index profile in the core consists of a radial series of at least 20 layers whose refractive index can be preset. Thus, a fiber with a discrete refractive index profile in the core can be produced which is matched to a large extent to the described shape by equation (3). Fibers produced in such a way can be dimensioned and used in the sense of this invention.

The refractive index profile described by equation (3) is to be "largely" maintained. But small fluctuations of the refractive index or the refractive index shape caused by production can occur. Nevertheless, these fibers are generally usable in the sense of this invention.

It is safe to assume (rough estimate) that the fiber in the sense of the invention is usable if one of the following conditions applies:

The fluctuations of the local refractive index values from the value preset by the ideal refractive index profile according to equation (3) are less than $0.06 \cdot \Delta n_k$. In this connection, the refractive index difference in the core of the fiber is $\Delta n_k$ according to equation (3).

The fluctuations of the local refractive index values from the values preset by the ideal refractive index profile according to equation (3) are less than $0.11 \cdot \Delta n_k \cdot (2r/D_k)$. The permissible deviations consequently can increase linearly with the distance from the fiber axis. In this connection, r is the distance from the fiber axis, $D_k$ is the core diameter and $\Delta n_k$ is the refractive index difference in the core of the fiber according to equation (3).

If the refractive index profile in the core is produced by a radial series of layers, then for the refractive index of the innermost and second innermost layer, $n_{k1}$ and $n_{k2}$, $n_{k1} - n_{k2}$ is less than or equal to $0.08 \cdot \Delta n_k \cdot D_{ku,2}/D_k$ if $n_{k1}$ is greater than $n_{k2}$, and $n_{k2} - n_{k1}$ is less than or equal to $0.05 \cdot \Delta n_k \cdot n_{ku,2}/D_k$ if $n_{k1}$ is less than $n_{k2}$.

In this connection, $D_{ku,2}$ is the outside diameter of the second innermost layer of the core. Fibers with these characteristics are also considered as included in the invention.

Any of these conditions can be readily achieved using state of the art deposition techniques, preferably, inner coating techniques, most preferably PICVD (plasma impulse chemical vapor deposition); see, e.g., "A novel plasma-impulse-CVD-process for the preparation of fiber preforms; D. Krause, V. Paquet, W. Siefert; Conf. proc. V-th IOOC -11th. ECOC Venice 1985, 7.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding application German P40 01 781.8, filed Jan. 23, 1990, are hereby incorporated by reference.

EXAMPLE

The initial radiation of an Nd:YAG laser with the radiation wavelength $\lambda$ of 1.064 $10^{-6}$ m with an average output $<P>$ of 40 W is to be transmitted. The laser is Q-switched with an acoustooptical modulator and emits a series of laser pulses with an average pulse time of about 120 ns with the frequency of about 4 kHz. Peak output $\hat{P}$ of a pulse is up to 150 kW. The laser radiation is radially symmetrical, the radiation modes largely correspond to Gauss-Laguerre modes. A maximum mode order o of 10 is determined at the output of the laser: most laser pulses have a radial mode order p of 2 (excluding the axes, two minima of intensity, i.e. "nodes," are counted in the radial direction) and an azimuthal mode order of 3 (6 minima of intensity are counted over the full periphery, 3 over the half-periphery): then $m = 2p + l + 1 = 8$ consequently applies.

A fiber according to this invention is selected with an exponent g of 2.1, a refractive index difference $\Delta n_k$ of $6 \cdot 10^{-3}$ and a core diameter $D_k$ of 400 microns.

The most strongly preferred embodiment according to FIG. 3 is selected. The shape of the refractive index is continuous on the core-cladding interface, i.e. no refractive index gap exists there. In the innermost layer of cladding 3-2, the refractive index decreases approximately linearly, i.e. the radial refractive index gradient $dn/dr = -63$ m$^{-1}$ is approximately constant there. The thickness of the innermost layer is 75 microns, i.e. the refractive index decreases by $-4.7 \cdot 10^{-3}$ in the innermost layer. Another layer 3-3 with the thickness of 25 microns lies on this innermost layer of the cladding; in this other layer, the refractive index relative to the value on the outer area of the innermost layer is further decreased by $-2 \cdot 10^{-3}$.

Diameter $D_w$ thus is 600 microns and within these "optically effective zones" of the fiber (the core and the two innermost layers of the cladding), the refractive index difference is only $12.7 \cdot 10^{-3}$. The fiber is produced from the most strongly preferred fiber components, $SiO_2$ and $F:SiO_2$, for the spectral region of about 1 micron with the PICVD process, an inner coating CVD process. The fiber consists of pure $SiO_2$ in the axis, the doping of the core increases in radial direction, from inside to outside. In this way, a refractive index difference of greater than $13 \cdot 10^{-3}$ can be easily introduced in fibers.

Still another cladding layer of $SiO_2$ glass with the thickness of 120 microns is found around the strongly doped second layer of the cladding; thus the outside diameter of the glass element of the fiber is 840 microns. Fibers with such dimensions are usual for transmission of high radiation outputs.

The mode radius of the fiber modes in the core of this fiber, depending on the mode order of the radiation modes, was determined at 70 . . . 80 microns. Starting from a peak radiation output of 150 kW, a maximum radiation output density of about 800 MW/cm² thus can be estimated for the core. It is known that the fiber materials used here can withstand this radiation output density without being damaged. Also no damage was observed in the described fibers.

In this fiber, it is observed that for the maximum mode order of the radiation on the end of the fiber o = 10 still holds, but it is determined that the radiation is distributed over more modes with $m = 2 \cdot p + l + 1$ less than or equal to 10.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flexible, optical, graded-index profile multimode fiber useful for transmission of laser radiation with high output and maximum mode order, o, with substantial preservation of the mode structure, having a fiber core with diameter $D_k$, a cladding around the core and a protective sheath around the cladding, wherein the refractive index profile in the core substantially follows the law of exponents:

$$n^2_k(r) = n^2_{k,i} - (n^2_{k,i} - n^2_{k,u}) \cdot (2 \cdot r/D_k)^g$$

wherein r is the distance from the fiber axis, $n_{k,i}$ is the refractive index in the fiber axis and $n_{k,u}$ is the refractive index in the core on the interface at the cladding, $n_{k,i}$ being greater than $n_{k,u}$, and, a) core diameter $D_k$ is between $200 \cdot 10^{-6}$ m and $800 \cdot 10^{-6}$ m.

b) but $D_k$ is at least 2.5 times $(o' \cdot \lambda)/\sqrt{\Delta n_k}$ and o' has the value 5 if the maximum mode order of laser radiation o is less than 5, $o' = o$ if o is in the range of 5 to 20, or $o' = 4.5 \cdot \sqrt{o}$ if o is greater than 20, $\sqrt{\Delta n_k}$ is the root of the refractive index difference $\Delta n_k$ in the core and $\lambda$ is the wavelength of the laser radiation to be transmitted.

c) exponent g is between 1.4 and 3.0 d) and the refractive index difference in the core, $$n_k = n_{k,i} - n_{k,u}$$

is greater than $1.6 \cdot 19^{-3}$.

2. An optical fiber according to claim 1, wherein core diameter $D_k$ is in the range of $300 \cdot 10^{-6}$ m to $600 \cdot 10^{-6}$ m 3. An optical fiber according to claim 1, wherein $\Delta n_k$ is greater than $3.3 \cdot 10^{-3}$.

4. An optical fiber according to claim 1, wherein $D_k$ is at least 5 times $(o' \cdot \lambda)/\sqrt{\Delta n_k}$, and o' has the value 3 if o is less than 3, $o' = o$ if o is in the range of 3 to 20, or $o' = 4.5 \cdot \sqrt{o}$ if o is greater than 20.

5. An optical fiber according to claim 1, wherein $D_k$ is at least 8 times $(o' \cdot \lambda)\sqrt{\Delta n_k}$, and o' has the value 3 if o is less than 3 and $o' = o$ if o is in the range of 3 to 20.

6. An optical fiber according to claim 1, wherein exponent g is between 1.6 and 2.4 if maximum mode order o is less than or equal to 10, and is between 1.8 and 2.2 if o is greater than 10.

7. An optical fiber according to claim 1, wherein $\Delta n_k$ is less than $4 \cdot 10^{-4} \cdot (D_k/\lambda)^2/o^2$, and $D_k$ is the core diameter of the fiber, $\lambda$ is the radiation wavelength, and o is the maximum mode order of the radiation (with o being greater than 1).

8. An optical fiber according to claim 1, wherein $\Delta n_k$ is less than $2 \cdot 10^{-5} \cdot (D_k/\lambda)^2/o^2$.

9. An optical fiber according to claim 1 useful for transmission of radiation with a radiation wavelength $\lambda$ in the range of $250 \cdot 10^{-9}$ m to $2 \cdot 10^{-6}$ m, wherein refractive index difference $\Delta n_k$ is less than $20 \cdot 10^{-3}$.

10. An optical fiber according to at claim 1 useful for transmission of radiation with a radiation wavelength $\lambda$ in the range of $250 \cdot 10^{-9}$ m to $2 \cdot 10^{-6}$ m, wherein refractive index difference $\Delta n_k$ is less than $10 \cdot 10^{-3}$.

11. An optical fiber according to claim 1, wherein exponent g is less than 1.95 or greater than 2.05.

12. An optical fiber according to claim 1, wherein exponent g is less than 1.90 or greater than 2.10.

13. A method of transmitting high output laser radiation having a maximum mode order, o, with substantial preservation of the radiation's mode structure comprising transmitting the radiation in a medium which is a fiber of claim 1.

14. An optical fiber according to claim 1 for transmission of radiation with a radiation wavelength $\lambda$ in the range of $250 \cdot 10^{-9}$ m to $2 \; 10^{-6}$ m, wherein the core consists of pure and fluorine-doped $SiO_2$ glass except for insignificant impurities and wherein the fluorine doping increases from inside to outside in the core.

15. An optical fiber according to claim 14, wherein the innermost layers of the cladding consist of pure fluorine- and $B_2O_3$-doped $SiO_2$ glass except for insignificant impurities.

16. An optical fiber according to claim 1, wherein directly on the core, there is a cladding layer with a thickness of at least $10 \cdot 10^{-6}$ m, in which the refractive index is at most as great as the minimum of the refractive index in the core.

17. An optical fiber according to claim 16, wherein the thickness of the cladding layer lying directly on the core is at least $50 \cdot 10^{-6}$ m.

18. An optical fiber according to claim 16, wherein the refractive index profile on the core-cladding interface has a smooth shape, or wherein if the refractive index in the cladding layer lying directly on the core is approximately constant, the refractive index in this layer is at least $1\sqrt{10^{-3}}$ less than the minimum of the refractive index in the core.

19. An optical fiber according to claim 18, wherein if the refractive index profile on the core-cladding interface has a smooth shape, the refractive index in the cladding layer lying directly on the core radially decreases from inside to outside with a refractive index difference of at least $2 \cdot 10^{-3}$.

20. An optical fiber according to claim 16, wherein a second cladding layer, whose thickness is at least $7 \cdot 10^{-6}$ m, lies on the first cladding layer lying directly on the core, and wherein the refractive index between the first and second cladding layer decreases by at least $1.5 \cdot 10^{-3}$.

* * * * *